United States Patent
Caryer Cook

(10) Patent No.: US 8,199,987 B2
(45) Date of Patent: Jun. 12, 2012

(54) ACOUSTOGRAPHIC DIAGNOSIS OF ABNORMALITIES

(75) Inventor: Valerie G. Caryer Cook, Clarkston, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 448 days.

(21) Appl. No.: 12/437,228

(22) Filed: May 7, 2009

(65) Prior Publication Data

US 2009/0279774 A1    Nov. 12, 2009

Related U.S. Application Data

(60) Provisional application No. 61/126,907, filed on May 8, 2008.

(51) Int. Cl.
*G06K 9/00* (2006.01)

(52) U.S. Cl. .................................. 382/128; 382/141

(58) Field of Classification Search .................. 382/128, 382/141
See application file for complete search history.

(56) References Cited

U.S. PATENT DOCUMENTS

| | | | |
|---|---|---|---|
| 6,958,950 | B2 | 10/2005 | Kim et al. |
| 7,098,865 | B2 | 8/2006 | Christensen et al. |
| 7,316,162 | B2 | 1/2008 | Hald |
| 7,839,721 | B1 * | 11/2010 | Clark .......................... 367/135 |
| 2003/0154054 | A1 | 8/2003 | Charette et al. |

OTHER PUBLICATIONS

Inter-Noise 2007; Istanbul, Turkey; Car-interior measurements using 3D-microphone arrays; Gunnar Heilmann, Siegfried Mayer, Andy Meyer and Dirk Döbler; 9 pgs.
SAE Technical Paper Series; 2005-01-2500; "Source Identification Using Nearfield Acoustic Holography Applied to a Seat Belt Retractor"; Christopher D. Morgan, Daniel Vaucher de la Croix, Dominique Fernier, Patrick Chevret and Carole Delamare; May 2005; 8 pgs.

* cited by examiner

*Primary Examiner* — Joseph Chang
(74) *Attorney, Agent, or Firm* — Ralph E. Smith

(57) ABSTRACT

An arrangement and method are provided for acoustographic diagnosis of abnormalities of a product, such as motor vehicle, that includes associating psychoacoustic vector beam data with a three-dimensional graphic surface model, and analyzing the three-dimensional graphic surface model to identify at least a portion thereof associated with unacceptable psychoacoustic levels.

4 Claims, 8 Drawing Sheets

ACOUSTOGRAPHIC DIAGNOSIS OF ABNORMALITIES

CROSS-REFERENCE TO RELATED APPLICATION

This application claims the benefit of U.S. Provisional Patent Application Ser. No. 61/126,907 filed May 8, 2008.

FIELD OF THE INVENTION

The present invention relates generally to product inspection, and more particularly to acoustic analysis of products.

BACKGROUND OF THE INVENTION

Products are routinely inspected for abnormal sounds indicative of potential manufacturing abnormalities, such as a loose fastener, a missing clip, or the like. For example, inspectors may drive a vehicle off an assembly line and onto a vehicle shaker or a test track to shake the vehicle to detect abnormal sounds indicative of potential latent manufacturing problems. The inspectors are well-trained to listen for the abnormal sounds, diagnose a possible root cause for the sounds, and suggest corrective action to an upstream manufacturing operation. While such inspection techniques are reasonably adequate, they can be labor intensive, particularly prone to human subjectivity, and otherwise lacking in objective data acquisition and reporting.

SUMMARY

In accordance with one aspect of the invention, a method of acoustographic diagnosis of abnormalities of a product is provided that includes associating psychoacoustic vector beam data with a three-dimensional graphic surface model, and analyzing the three-dimensional graphic surface model to identify at least a portion thereof associated with unacceptable psychoacoustic levels.

The method can include recording as a potential normality a location of an identified at least a portion of the three-dimensional graphic surface model and psychoacoustic vector beam data associated with the identified at least a portion. The method can further include determining whether the potential abnormality is an established abnormality; flagging the product for repair if the potential abnormality is an established abnormality; and otherwise associating a location of the potential abnormality with a corresponding location of a three-dimensional graphic solid model to identify product components corresponding to the location of the potential abnormality, and identifying potential assembly tolerance issues associated with the location of the potential abnormality to facilitate root cause analysis of the potential abnormality.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Exemplary System

Figure 1:
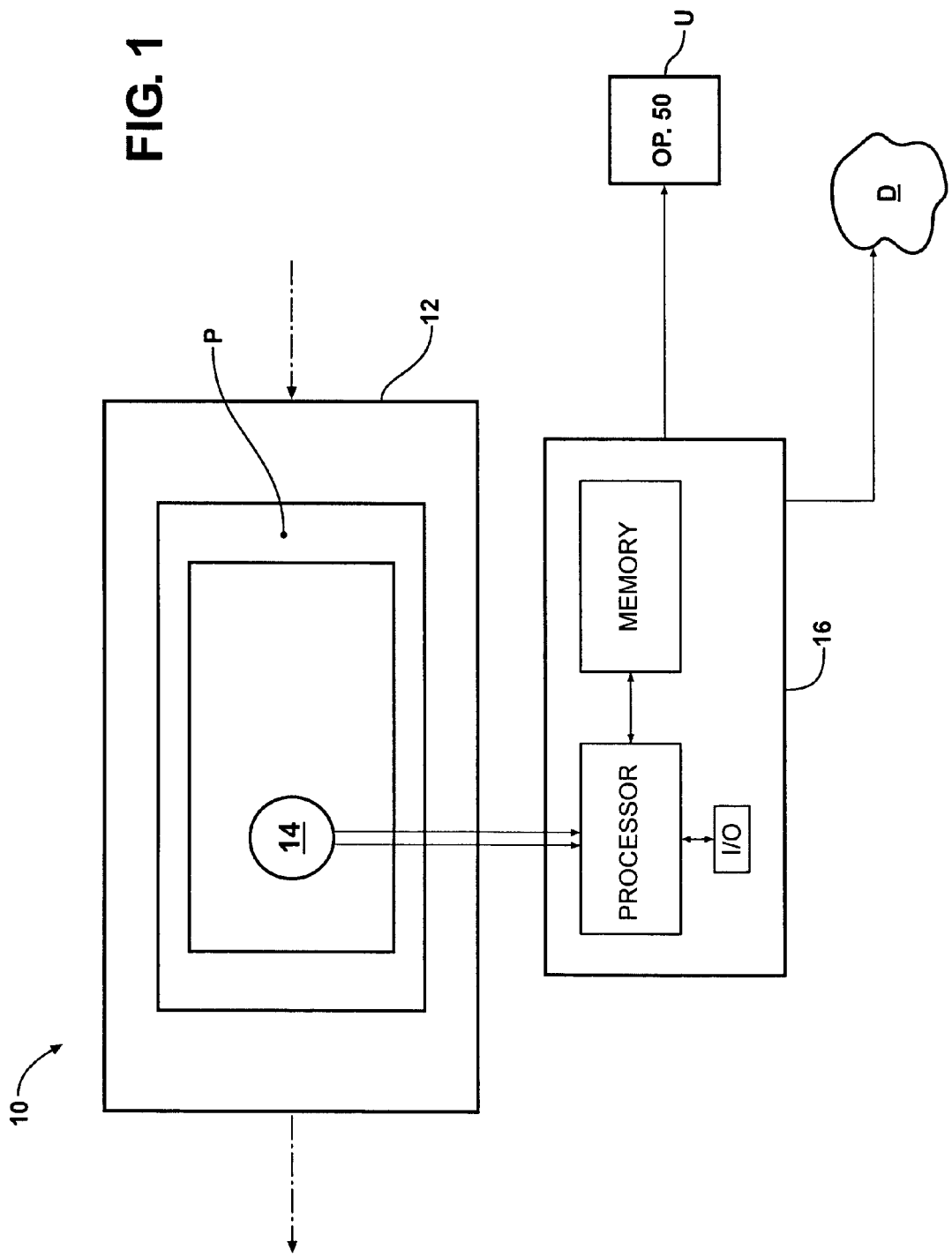
FIG. 1 is a schematic diagram of an exemplary embodiment of a diagnostic system.

An exemplary operating environment is illustrated in FIG. 1, and may be

An exemplary operating environment is illustrated in FIG. 1, and may be used to implement the arrangement for and method of acoustographic diagnosis of abnormalities of a product as described herein. The method may be carried out using any suitable system and, in and an exemplary embodiment, is carried out in conjunction with a diagnostic system 10. It is noted that while the following system description is directed to the exemplary diagnostic system, other systems and components not shown here could also support the diagnosis arrangement and method as disclosed and claimed herein.

The diagnostic system 10 is used to acoustographically diagnose abnormalities of a product P, which may be a vehicle for example, or any other suitable type of product. The abnormalities may be manufacturing related, such as a missing clip, loose fastener, or the like, or may be product design related such as undesirable component stack up conditions, interference conditions, or the like. The system 10 includes an energy imparting device 12 to impart energy to the product P in any suitable manner, and one or more acoustic sensing devices 14 to sense sound and/or vibration emitted by the product P at least while energy is being imparted thereto. The system 10 also includes a data acquisition or computing device 16 to receive data from the acoustic sensing device(s) 14, process and store the data, and output processed data, for example, to an upstream manufacturing operation U and/or to a product design operation D.

The energy imparting device 12 may be a vehicle shaker, for example, or any other suitable type of device or arrangement to impart energy to a product. Vehicle shakers are well known to those of ordinary skill in the art and may include "four poster" vibratory shakers that shake an assembled vehicle to simulate actual vehicle driving conditions. The energy imparting device 12 may be manually controlled, or automatically controlled such as by the computing device 16 and/or any other computing device(s) (not shown) that may or may not be coupled to the computing device 16. The device 12 may be located at or toward an end of a product assembly line, in a product design laboratory, or the like. The device 12 instead may be a test track, road, or the like that may be traversed by the vehicle to impart energy to the vehicle.

The acoustic sensing device(s) 14 may include one or more beamforming arrays, or any other suitable type of device(s) to sense sound emitted from a product. Acoustic sensing devices and beamforming arrays are well known to those of ordinary skill in the art. In particular, one or more spherical beamforming arrays may be used. One exemplary type may include one or more substantially solid spheres that may carry a plurality of acoustic transducers near or on surfaces of the spheres. Another exemplary type may include one or more spherical lattices that may carry a plurality of transducers in one or more radial locations of the lattices. Exemplary spherical beamforming arrays include those commercially available from Bruel & Kjaer of Denmark, and GFaI Technologies of Germany. The device(s) 14 may or may not include one or more imaging devices such as video and/or photo cameras, which are well known those of ordinary skill in the art.

The computing device 16 may include a desktop computer, laptop computer, network computer, programmable logic controller, and/or any other suitable type of device to process data and/or execute program instructions. The data may include signals received from the acoustic device 14 and excitation input data from device 12, and program instructions may substantially include one or more of several method steps described herein below. The computing device 16 may also include a processor to run programs and access data, an internal memory to store programs and data, and an external memory interface to accommodate memory expansion. The computing device 16 may additionally include an external input/output (I/O) interface to communicate with external devices or entities such as the acoustic sensing device 14, or manufacturing operation U or product design operation D. The computing device 16 may further include an internal I/O interface to communicate with internal devices such as internal memory, a power supply such as a battery to power the processor, a communications module such as a system, bus, digital to analog (D/A) converters, A/D converters, signal conditioners, and/or any other suitable types of computing devices. All of the aforementioned computing devices are well known to those of ordinary skill in the art.

Exemplary Method

Figure 2:
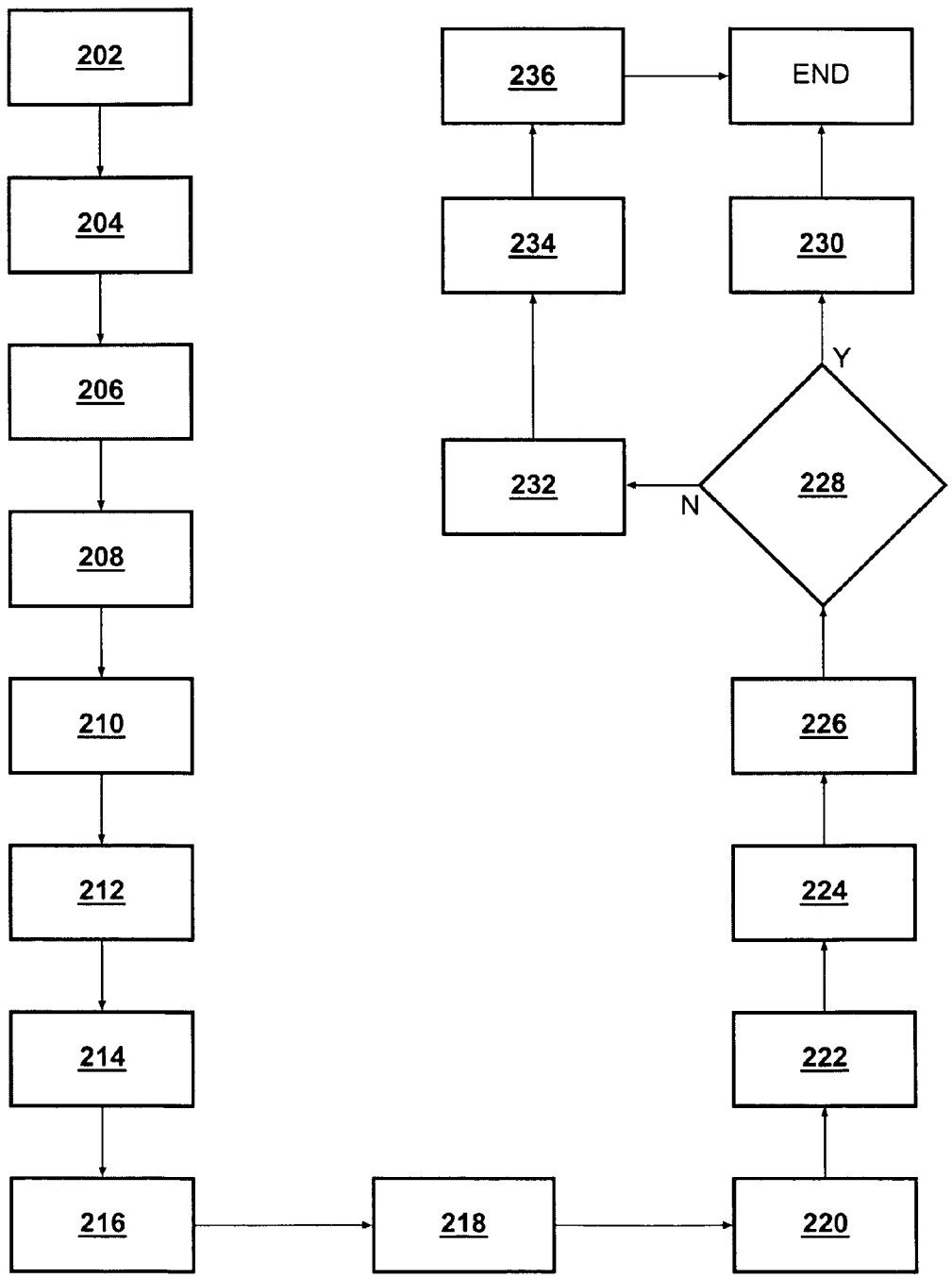
FIG. 2 is a flow chart of an exemplary embodiment of a method of diagnosing abnormalities of a product.

A method of diagnosing abnormalities of a product is provided herein and one or more steps of the method may be carried out as one or more computer programs within the operating environment of the diagnostic system 10 described above. Those skilled in the art will also recognize that the method may be carried out using other diagnostic systems within other operating environments. As one example, the method may be used as an inspection tool for buzz, squeak, and rattle (BSR) product acceptance testing in automotive assembly plants. Referring now to FIG. 2, an exemplary method 200 is illustrated in flow chart form with reference to FIGS. 1 and 3 through 7.

At step 202, an acoustic sensing device may be placed in a sensing location with respect to a product. For example, the acoustic sensing device 14 may be placed in, on, or near enough to the product P to obtain measurements therefrom. More particularly, a spherical beamforming array may be placed in a vehicle with or without doors or other closures in closed positions, under the vehicle, over the vehicle, in front, in back, or to the side(s) of the vehicle.

At step 204, a relationship between a sensing location of an acoustic sensing device with respect to a physical datum of a product may be determined.

In a first example, the acoustic sensing device 14 may be placed with respect to the product in a sensing location that is the same for like products and corresponds to a physical datum of the product. For example, the sensing location may be an established location for a center of a beamforming array in a product body coordinate system. The sensing location may be an actual hard point associated with a vehicle, for instance, in or on a vehicle, or on a fixture that locates the vehicle or that is mechanically associated or located with respect to a fixture or a shaker that locates the vehicle. Accordingly, such a relationship is substantially predetermined.

Figure 3:
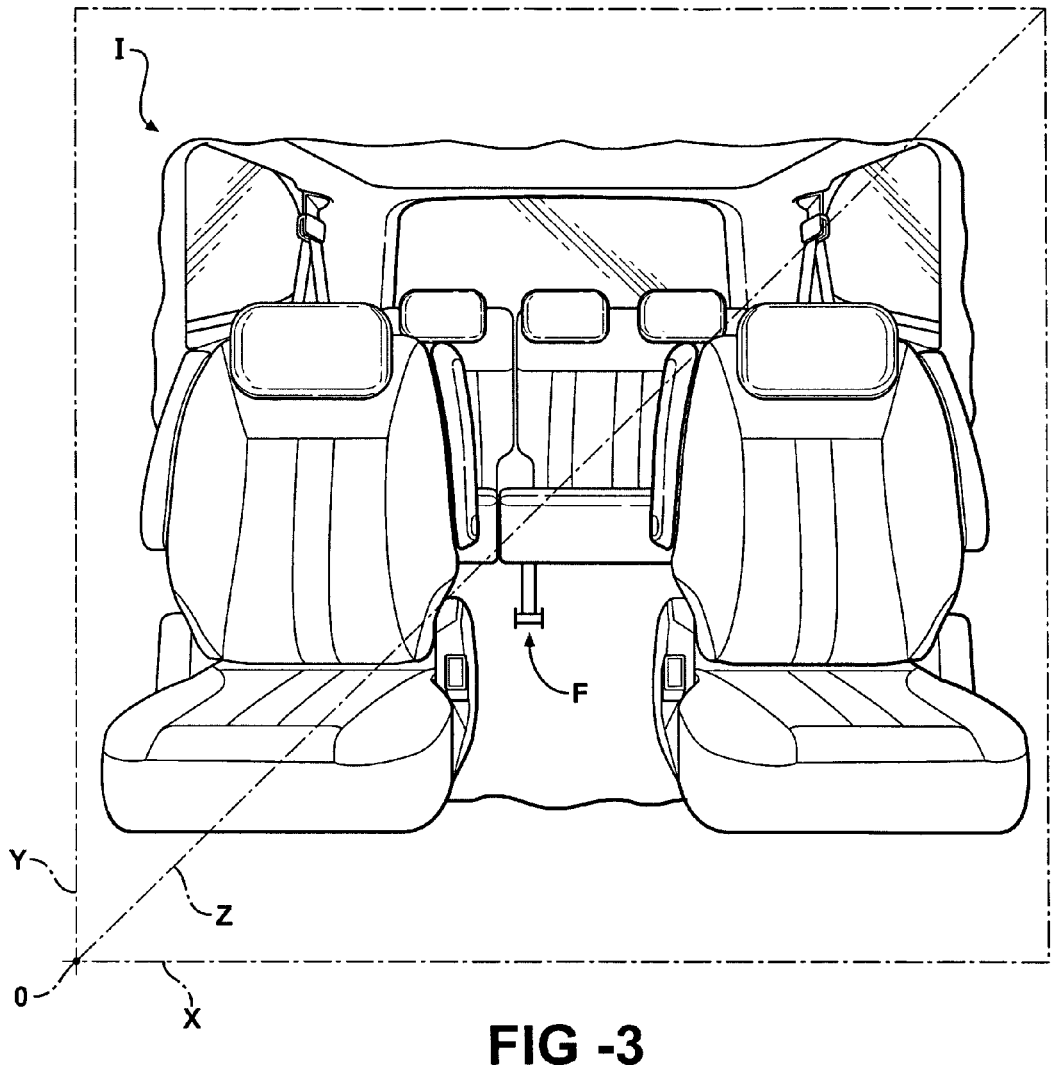
FIG. 3 is a rearward perspective view of an interior of a vehicle, showing X, Y, and Z axes.
Figure 4:
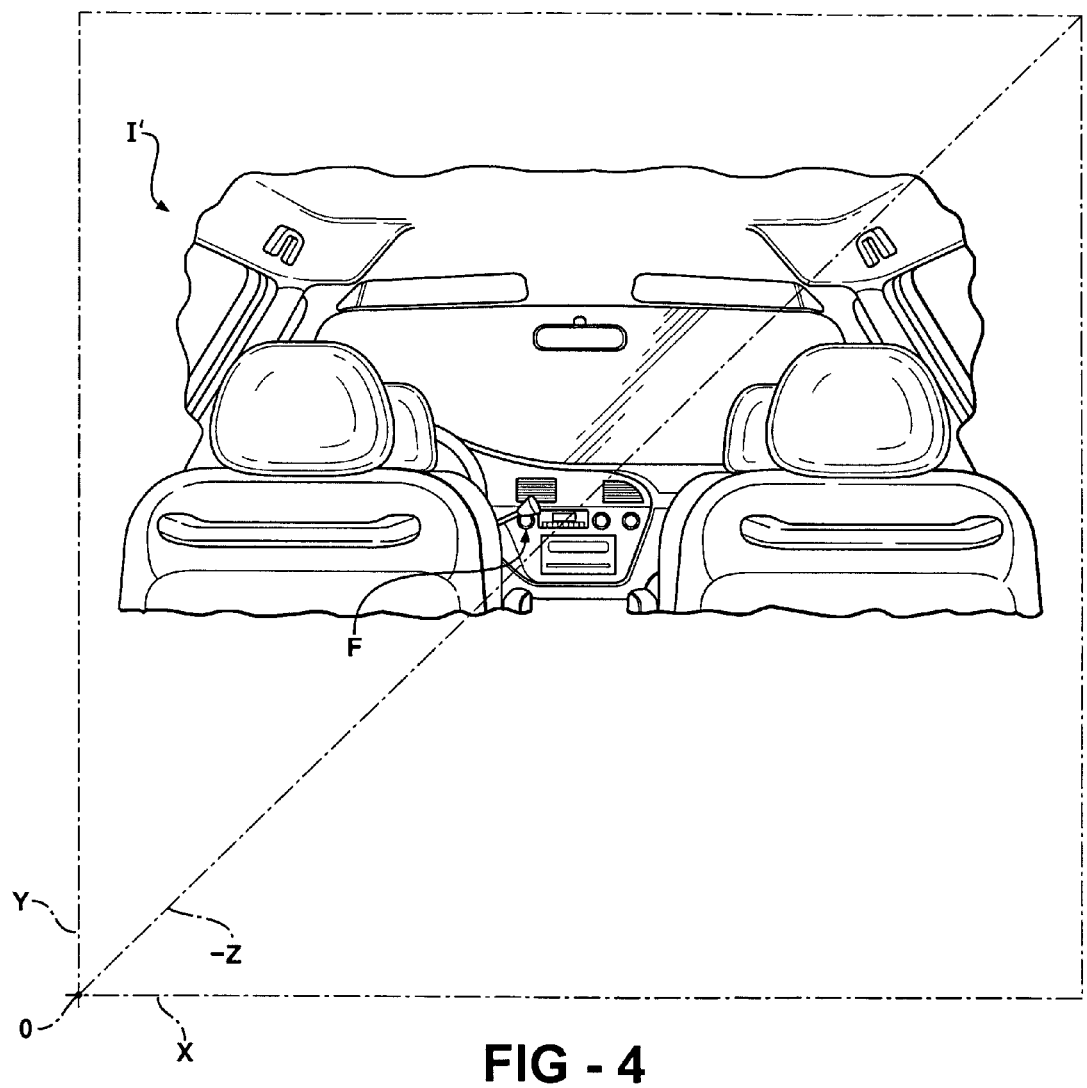
FIG. 4 is a forward perspective view of an interior of a vehicle, showing X, Y, and −Z axes.

In a second example, such as where the sensing location may be a random location or a location that is not mechanically associated to the location of the vehicle, the relationship may be determined by photo co-location using one or more imaging devices with a predetermined physical relationship to the acoustic sensing device 14. The imaging device(s) may include one or more photo or video cameras that may capture a photograph or video image of the product. For example, FIGS. 3 and 4 illustrate exemplary images I, I' that may be captured by an imaging device of an acoustic sensing device. The images I, I' may include orthogonal or Cartesian coordinate axes such as exemplary X, Y, and Z axes with an origin O, as shown. Next, one or more physical datums of the product may be recognized in the captured image. For example, a seat anchor point F in FIG. 3 and/or an instrument panel knob F' in FIG. 4 are just a couple of exemplary physical datums that may be recognized in the captured images as imaged features. Then, the location of the acoustic sensing device may be inferred based on where the physical datum appears in the image, its size, skew, and/or any other suitable parameters of the imaged datum. For example, if the physical datum appears smaller than expected according to a calibrated expected size, then it may be inferred that the acoustic sensing device is offset rearwardly of a calibrated expected location of the device, and vice versa. In a similar example, if the physical datum appears shifted left relative to a calibrated expected location, then it may be inferred that the sensing device is offset to the right of a calibrated expected location of the device, and vice versa. The magnitude of such offsets may be quantitatively determined in any suitable manner, for example, via calibration or the like. As a modification to this example, a CAD feature like a "cumulative snap" function may be used to compare a plurality of imaged datums to a corresponding plurality of CAD graphical datums and align the imaged data to the CAD data.

Figure 5:
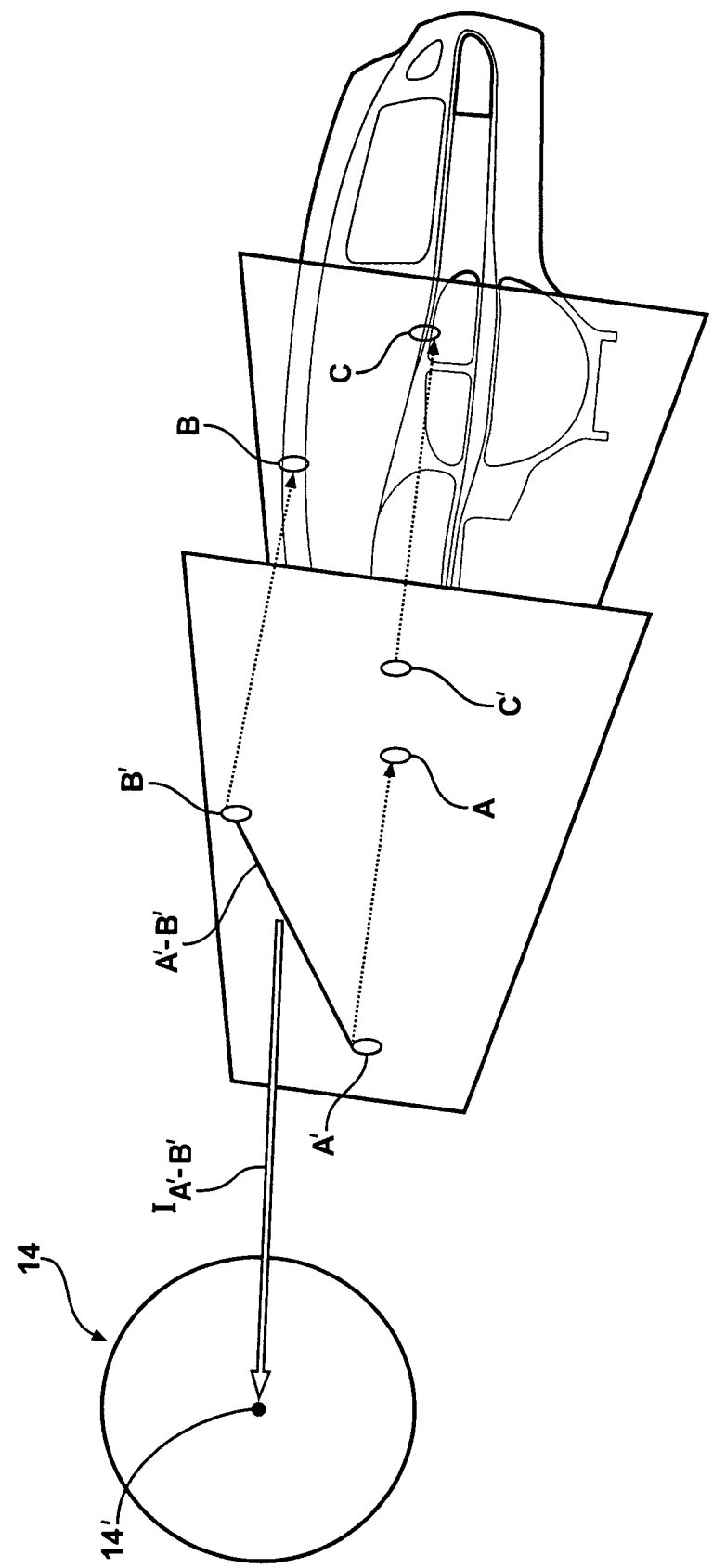
FIG. 5 is a schematic diagram of a technique to establish a location or alignment of a sensing device with respect to a product.

In a third example, and referring to FIG. 5, three locating points of a three-dimensional graphic surface model may be defined such as by predetermined physical features of the product. The distance between such features is known, and a three-dimensional graphical surface model projection plane may be defined by the three locating points A, B, C. An operator of the imaging device 14 may use a cursor or crosshairs to select virtual or imaged location points A', B', C' that correspond to the physical feature location points A, B, C of the product. The acoustic focal length for the image is known. Line segments A'-B', B'-C', C'-A' may be established between the imaged location points A', B', C', and midpoints of these line segments may be calculated in any suitable manner. Using known pin-hole camera physics techniques, distances of imaginary lines (e.g. $I_{A'-B'}$) between a camera 14' and the sensing device 14 and the midpoints of the segments A'-B', B'-C', C'-A' may be calculated. The location of the camera 14' is calculated as the point of convergence where the three imaginary lines intersect.

At step 206, a sensing location of an acoustic sensing device may be correlated to a three-dimensional graphic surface model of a product based on the determined relationship from step 204. As used herein, the terminology three-dimensional graphic surface model may include a three-dimensional graphic surface model from a computer-aided design (CAD) file such as CATIA brand software or the like, stereolithography data or files, or the like.

In a first example, where the sensing location is an actual hard point associated with a vehicle, a virtual hard point of the three-dimensional graphic surface model corresponding to the actual hard point of the vehicle may be used. Accordingly, such a relationship is substantially predetermined.

In a second example, where the sensing location may be random or not mechanically associated to the vehicle, an origin or features of one or more images captured by the imaging device may be associated with a corresponding origin or features of the three-dimensional graphic surface model. The captured image(s) may include a captured feature that corresponds to a physical feature of the vehicle and a corresponding virtual feature in the three-dimensional graphic surface model. Then, a vector or coordinates of data of the captured image(s) associated with the captured feature may be compared to a corresponding vector or coordinates of the corresponding virtual feature of the three-dimensional graphic surface model. The difference or offset between the captured feature and the virtual feature may be used to infer the actual sensing location or establish the array location in the product body coordinate system used by the three-dimensional graphical surface model.

At step 208, an acoustic focal length associated with an acoustic sensing device may be set to an initial distance with respect to a projection plane of the sensing device. As used herein, the term projection plane may be virtual and may include a flat plane, a curved surface, or the like. For example, and referring also to FIG. 6, the initial acoustic focal length Lf of the sensing device(s) 14 may be set to infinity, or substantially close to a physical extent or most distal surface (with respect to the sensing device) of a product being diagnosed, or to a maximum or furthest extent from the sensing device(s) 14 that may be associated with a noise source, or to any other suitable extent. Preferably, the projection plane or surface may be an arbitrary plane or surface at approximately any distance between the beamforming array and a furthest potential sound or noise source of the product.

At step 210, energy may be imparted to a product. For example, the energy imparting device 12 may be used to move, shake, or otherwise excite the product P. In a particular example, a vehicle shaker may be used to shake a vehicle in any suitable manner. In another example, a test track with Belgian blocks, or the like may be used to impart energy to the vehicle when the vehicle is traversed over such a surface.

At step 212, objective acoustic data may be sensed using an acoustic sensing device at least while energy is being imparted to a product. For example, the acoustic sensing device 14 may be used to sense sound emitted from the product P at least while the energy imparting device 12 is imparting energy to the product P. In a more particular example, a spherical beamforming array may be used to sense noise at least while a vehicle shaker is shaking a vehicle. The sensed objective acoustic data may include sound pressure, frequency, wave shape, or any other suitable acoustic parameter data.

At step 214, sensed objective acoustic data may be transformed into acoustic vector beam data Va. The vector beam data Va may identify an acoustic hot spot Bmax on an initial projection plane. For example, the computing device 16 may be used to transform objective acoustic data sensed by the acoustic sensing device 14. More particularly, the computing device 16 may use the initial acoustic focal length and apply beamforming techniques (spherical or otherwise) to the sensed objective acoustic data to generate acoustic vector beam data.

Figure 6:
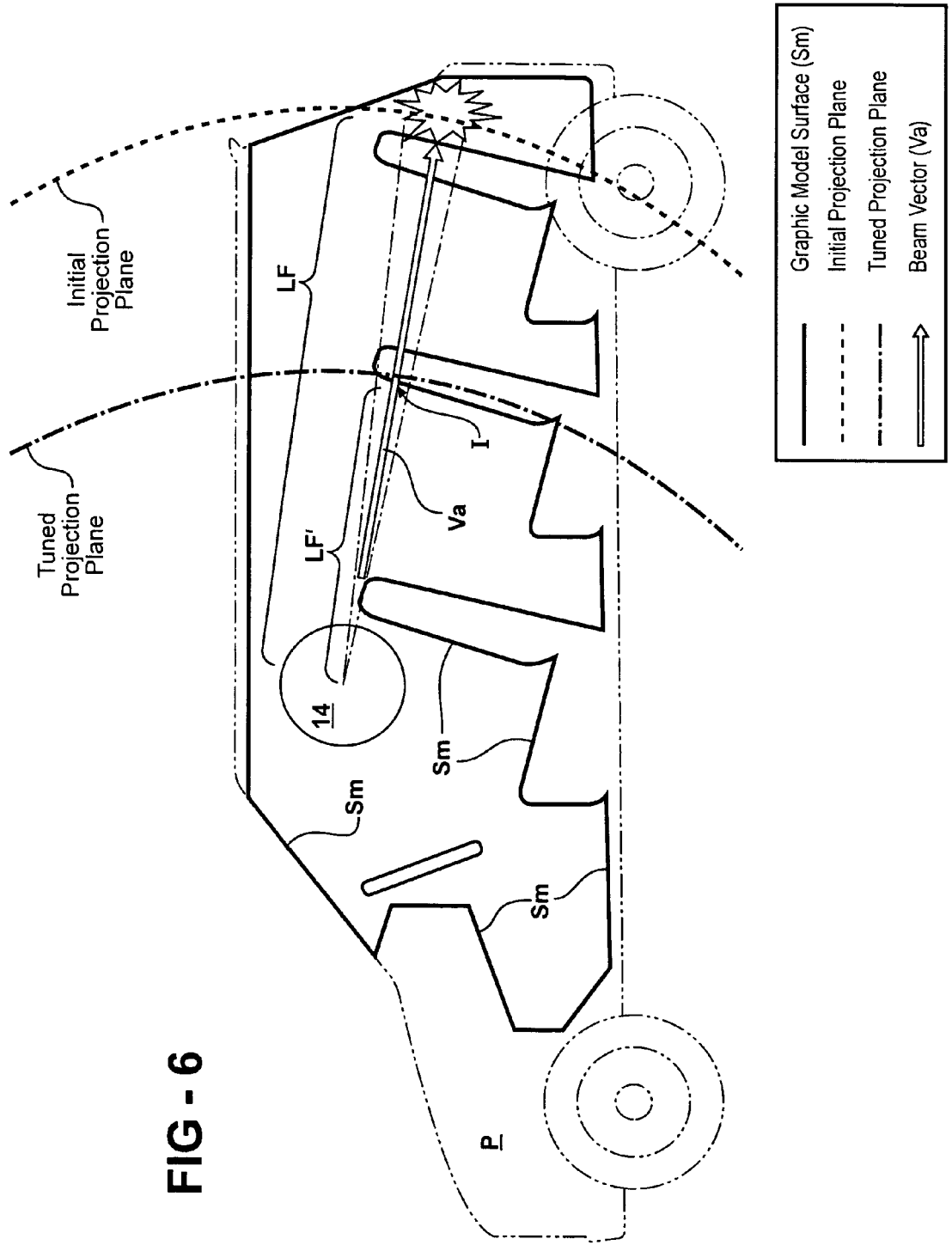
FIG. 6 is a schematic diagram of a relationship between a pre-set acoustic focal length, and an adjusted or set acoustic focal length in the context of a three-dimensional graphic surface model of an interior of a vehicle.

At step 216, an acoustic focal length associated with an acoustic sensing device may be set. Referring to FIG. 6, the acoustic focal length may be associated with an acoustic hot spot B'max at a graphic surface model surface indicating an actual source distance to the sensing device. For example, the set focal length Lf' may be associated with an intersection I of an acoustic vector beam data Va, such as from step 214, and a three-dimensional graphic surface model Sm, such as from step 206. The distance from the sensing device 14 to the intersection I is the set acoustic focal length Lf' which is less than a pre-set acoustic focal length Lf.

At step 218, acoustic vector beam data may be tuned or recalculated based on an updated acoustic focal length Lf'. For example, the computing device 16 may be used to transform objective acoustic data sensed by the acoustic sensing device 14, using the updated acoustic focal length Lf' and applying spherical beamforming techniques to the sensed objective acoustic data to recalculate the acoustic vector beam data associated with the acoustic hot spot B'max.

At step 220, acoustic vector beam data may be converted into psychoacoustic vector beam data. For example, the recalculated acoustic vector beam data from step 218 may be converted into psychoacoustic vector beam data using any of several techniques, which are well known to those of ordinary skill in the art. Psychoacoustic vector beam data may include N10 loudness, sharpness, roughness, and/or any other suitable parameters such as those included in ISO Standard 532B. Such parameters may better represent sound emitted from a product as perceived by a human compared to as sensed by the sensing device 14. For example, although the sensing device 14 may "hear" high-pitched noise from a dog whistle, such sound cannot be heard by a human and, thus, is excluded.

At step 222, psychoacoustic vector beam data may be associated with a three-dimensional graphic surface model. For example, the psychoacoustic vector beam data may be projected onto at least a portion of a surface of the three-dimensional graphic surface model of step 206. The model may be a single continuous surface or may include a plurality of finite, discrete, mesh elements of hexagonal, triangular, or any other suitable shape and size.

At step 224, a three-dimensional graphic surface model may be analyzed to identify at least a portion thereof associated with unacceptable psychoacoustic levels. For example, the three-dimensional graphic surface model may be analyzed to identify a psychoacoustic hot spot, which may include at least one of a plurality of mesh elements that may be associated with psychoacoustic vector beam data that exceeds a predetermined psychoacoustic threshold value. Exemplary parameters of the threshold values may include any suitable psychoacoustic parameters such as loudness, roughness, sharpness, etc. The values may be predetermined in any suitable manner including experimentation, calibration with subject human tolerance or preference levels, and/or the like. In a particular non-limiting example, N10 levels can be specified for particular locations, such as six sones for a potentially noisy area like a glove box, and only four sones for a typically quiet area like an instrument panel surface.

At step 226, a location of an identified psychoacoustic hot spot on at least a portion of a three-dimensional graphic surface model and psychoacoustic vector beam data associated with the identified psychoacoustic hot spot may be recorded as a potential abnormality. For example, one or more of a plurality of mesh elements, their locations, and associated excessive psychoacoustic vector beam data may be stored in memory by the computing device 16. The locations of the mesh elements may be identified by grid location, coordinates, or any other suitable technique.

At step 228, a determination may be made as to whether a potential abnormality is an established abnormality. For example, the potential abnormality from step 226 may be compared or cross-referenced against a database or lookup table of known or cataloged abnormalities, which may include locations and psychoacoustic vector beam data collected during product development, product calibration, or as a matter of historical manufacturing data collection of the diagnostic system 10.

At step 230, a product may be flagged for a repair associated with an established abnormality. For example, the established abnormalities described in step 228 may be associated with corresponding repairs based on lessons learned from product development, product calibration, or as a matter of historical manufacturing data collection of the diagnostic system 10. Accordingly, repair instructions for established abnormalities may be generated and communicated to an upstream manufacturing operation or an off-line repair station.

At step 232, a location of a potential abnormality may be associated with a corresponding location of a three-dimensional graphic solid model to identify product components corresponding to the location of the potential abnormality. An exemplary model may include a CATIA brand solid model, stereolithography solid model, or any other suitable solid model(s). For example, the three-dimensional graphic surface model from step 206 may be segmented or divided into a plurality of different regions, mesh elements, or the like, each of which may be associated with one or more product components that may or may not be visible when viewing the surface model. In other words, the associated components may be behind surfaces of the product that appear in the surface model. Therefore, any components associated with a particular location of the three-dimensional graphic solid model can be associated with the location of an identified excessive psychoacoustic level of the surface model. The surface and solid models may use the same coordinate system, or may be correlated using datums, or the like. Accordingly, a known or identified location from the surface model may be correlated with and/or transferred to a corresponding location of the solid model.

Figure 7:
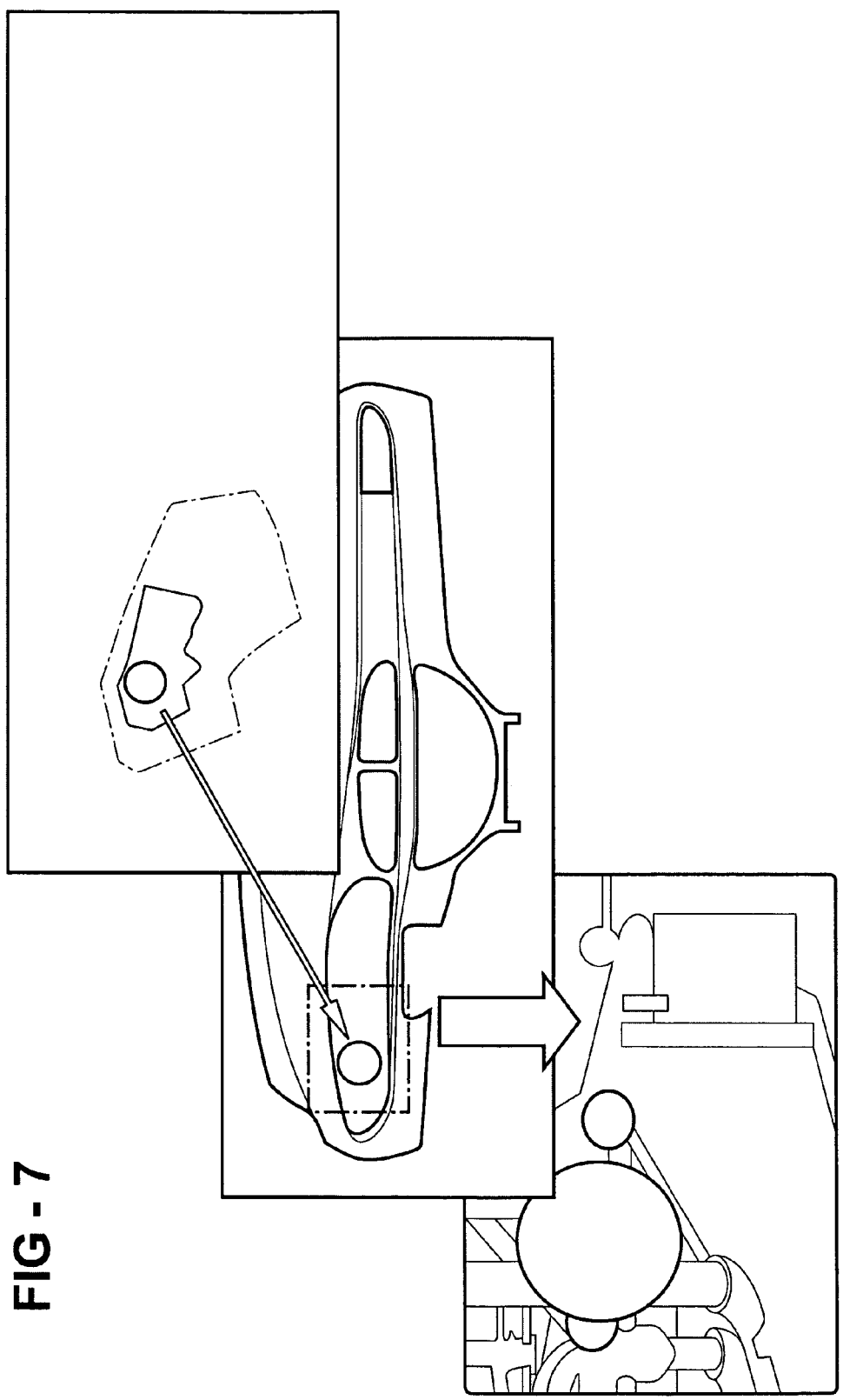
FIG. 7 is a schematic diagram of a relationship between a psychoacoustic data map, three-dimensional graphic surface model of an interior of a vehicle, and a corresponding three-dimensional graphic solid model of sub-assemblies and/or components of the vehicle.

At step 234, potential assembly tolerance issues associated with a location of a potential abnormality may be identified to facilitate root cause analysis of the potential abnormality. Referring to FIG. 7, one may use an identified grid location on a CAD file surface to drill down to subordinate CAD data or files to unlock information useful in facilitating root cause analysis and categorization of abnormalities found. Beginning with an identified acoustic hot spot, one may use a grid reference associated with the hot spot to access digital file data and/or CAD metadata of the affected area. Such files or data may be used for virtual packaging studies during vehicle development and may show component clearance risk areas near the hot spot or a worm's eye view of a potential abnormality or design issue behind surface trim panels or the like of a vehicle interior. Snap shots of such areas may be used to reduce a number of components that need to be removed during root cause analysis, or to provide quick graphic input to accompany repair instructions. In addition, CAD metadata such as part numbers, design levels, and contact information may enable prompt high quality abnormality reporting and communication. Thus, the method is not only an inspection tool but also a root cause analysis and process feedback tool.

Figure 8:
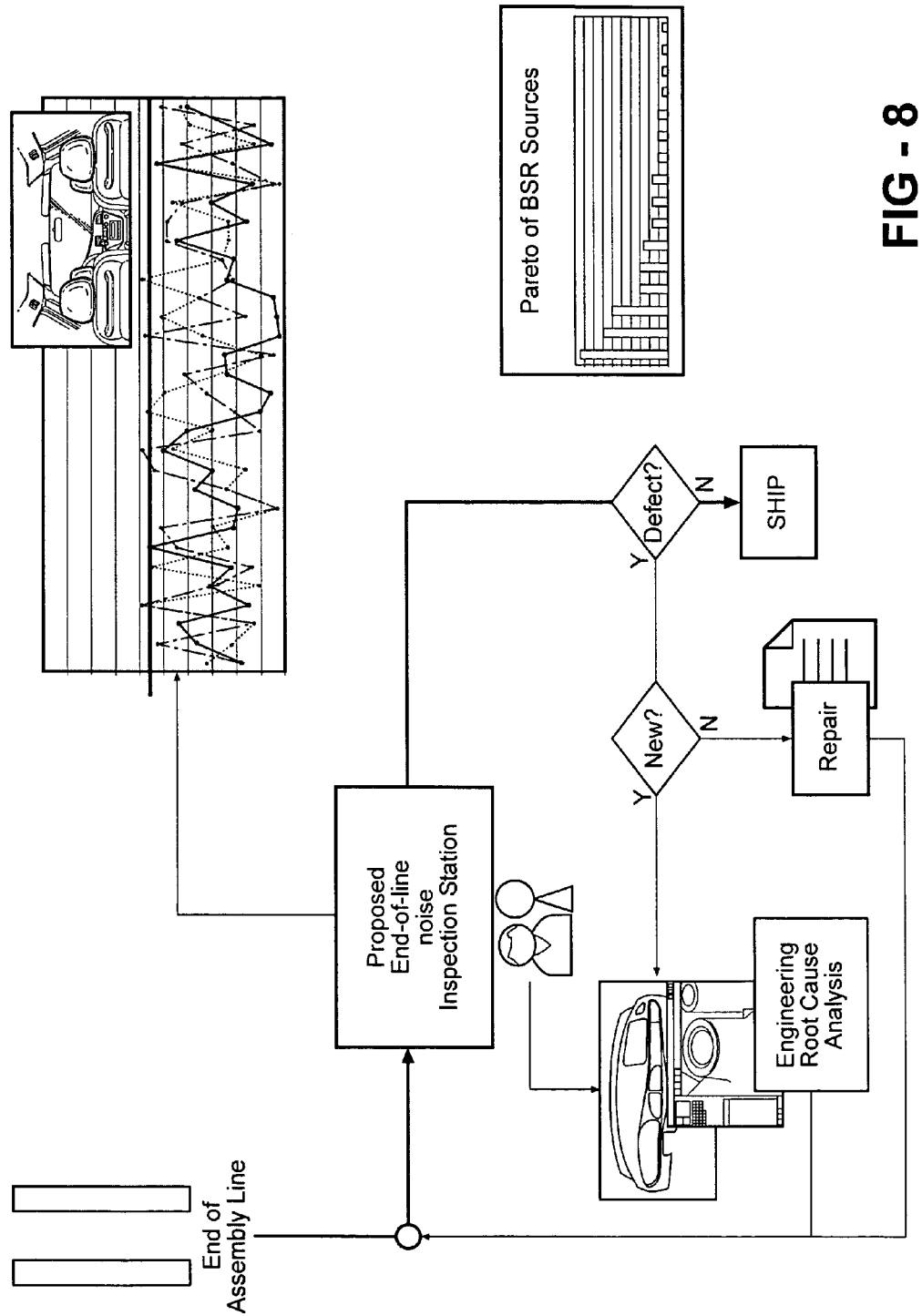
FIG. 8 is a schematic diagram of an exemplary product assembly line using the method disclose herein.

Referring also to FIG. 8, such capabilities may enable an assembly plant to move from quality control by inspection toward more preventative methods. For instance, a link to part numbers involved with a recurring BSR condition may allow design engineers to obtain accurate information on prevalence and severity of issues for developing more robust future designs. Part number information may also be used to direct real-time communication to assembly plant area managers for abnormalities that may be controlled or eliminated in their areas. As an assembly plant develops a library of acoustic related abnormalities and their root causes, accumulated historical data from the system may be evaluated using data mining techniques such as cluster analysis and radial basis functions to identify data streams in the plant that may be monitored to anticipate BSR conditions.

At step 236, data associated with a three-dimensional graphic solid model may be communicated to an upstream manufacturing operation or an off-line repair station to address a potential abnormality. For example, the data may include identification of any components associated with the potential abnormality from step 232, and/or drawings, graphics, files, or the like that are associated with those components or with the product being diagnosed. In another example, the data may include the potential tolerance issues from step 234. In a further example, the data may include charts or the like to track real time objective process capability information for recurring noise issues. Such data also or instead may be fed to various systems or operations including plant quality, suppliers, design engineering, manufacturing engineering, production management, and/or the like.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. The invention is defined by the following claims.

What is claimed is:

1. A method of acoustographic diagnosis of abnormalities of a product, comprising:

placing an acoustic sensing device in a sensing location with respect to the product;

determining a relationship between the sensing location of the sensing device with respect to a physical datum of the product;

correlating the sensing location of the sensing device to the three-dimensional graphic surface model of the product based on the determined relationship;

pre-setting an acoustic focal length associated with the sensing device to an initial distance with respect to a projection plane of the sensing device;

imparting energy to the product;

sensing objective acoustic data using the sensing device at least while energy is being imparted to the product;

transforming the sensed objective acoustic data into acoustic vector beam data;

setting the acoustic focal length;

recalculating the acoustic vector beam data using the set acoustic focal length;

converting the recalculated acoustic vector beam data into psychoacoustic vector beam data which is then associated with a three-dimensional graphic surface model; and analyzing the three-dimensional graphic surface model to identify at least a portion thereof associated with unacceptable psychoacoustic levels.

2. The method of claim 1, further comprising:

recording as a potential abnormality a location of an identified at least a portion of the three-dimensional graphic surface model and psychoacoustic vector beam data associated with the identified at least a portion.

3. The method of claim 2, further comprising:

determining whether the potential abnormality is an established abnormality;

flagging the product for repair if the potential abnormality is an established abnormality; otherwise associating a location of the potential abnormality with a corresponding location of the three-dimensional graphic solid model to identify product components corresponding to the location of the potential abnormality; and identifying potential assembly tolerance issues associated with the location of the potential abnormality to facilitate root cause analysis of the potential abnormality.

4. A method of acoustographic diagnosis of abnormalities of a product, comprising:

associating psychoacoustic vector beam data with a three-dimensional graphic surface model;

analyzing the three-dimensional graphic surface model to identify at least one mesh element thereof associated with unacceptable psychoacoustic levels;

recording a location of the identified mesh element(s) and psychoacoustic vector beam data associated with the identified mesh element(s) as a potential abnormality;

determining whether the potential abnormality is an established abnormality;

associating the location of the potential abnormality with a corresponding location of a three-dimensional graphic solid model to identify product components corresponding to the location of the potential abnormality;

identifying potential component interface tolerance issues associated with the location of the potential abnormality to facilitate root cause analysis of the potential abnormality; and communicating data associated with the three-dimensional graphic solid model to at least one of an upstream manufacturing or product design engineering operation to address the potential abnormality.

* * * * *